United States Patent [19]

Lacey, Jr. et al.

[11] Patent Number: 5,505,081
[45] Date of Patent: Apr. 9, 1996

[54] VALVE ASSEMBLY FOR FREE PISTON SHOCK TUBE/TUNNEL

[75] Inventors: John J. Lacey, Jr., Minnetonka; Bruce C. Lindahl, St. Louis Park, both of Minn.

[73] Assignee: Aero Systems Engineering, Inc., St. Paul, Minn.

[21] Appl. No.: 305,113

[22] Filed: Sep. 13, 1994

[51] Int. Cl.⁶ .................................................. G01L 23/00
[52] U.S. Cl. .............................................. 73/147; 73/12.07
[58] Field of Search ............................... 73/11.04, 12.05, 73/12.07, 12.08, 147

[56] References Cited

U.S. PATENT DOCUMENTS

| | | |
|---|---|---|
| 2,836,063 | 5/1958 | Yoler et al. . |
| 3,075,065 | 1/1963 | Ducati et al. ............................... 73/147 |
| 3,109,305 | 11/1963 | Kilmer et al. ............................ 73/147 |
| 3,184,097 | 5/1965 | Kilmer et al. ............................ 73/147 |
| 3,431,777 | 3/1969 | Norfleet . |
| 3,495,455 | 2/1970 | Allgood . |
| 4,696,182 | 9/1987 | Meir . |
| 4,898,028 | 2/1990 | Brehm . |
| 5,115,665 | 5/1992 | Lacey, Jr. . |
| 5,245,868 | 9/1993 | Lacey, Jr. . |

FOREIGN PATENT DOCUMENTS

8902071  3/1989  WIPO .

*Primary Examiner*—Richard Chilcot
*Assistant Examiner*—Ronald Biegel
*Attorney, Agent, or Firm*—Dorsey & Whitney

[57] ABSTRACT

A free piston shot tube tunnel having a high speed valve for releasing the piston to start the piston shot. A further feature of the present invention is a free piston shock tube/tunnel having a high speed valve for releasing pressure from the compression tube into the shock tube.

20 Claims, 5 Drawing Sheets

| Fig. 1a |
|---|
| Fig. 1b |
| Fig. 1c |

VALVE ASSEMBLY FOR FREE PISTON SHOCK TUBE/TUNNEL

BACKGROUND OF THE INVENTION

1. Field of the Invention

The present invention relates generally to a free piston shock tube/tunnel, and more particularly to a free piston shock tube/tunnel with an improved high speed valve assembly for releasing the piston at the start of the shot. A further feature involves a high speed valve assembly designed to release high pressure gas downstream of the piston and to replace the conventional diaphragm.

2. Description of the Prior Art

Free piston shock tube/tunnels have existed since the 1950's. During operation, such shock tube/tunnels are able to generate a shock wave of extremely high pressure and high temperature at a test site for a desired duration or test time. Free piston shock tube/tunnels are principally used to provide aerodynamic test conditions for rocket nose cones, space re-entry vehicles, hypersonic aircraft and the like.

In general, free piston shock tube/tunnels includes an elongated, generally cylindrical compression tube containing a compression or driver gas such as helium. The compression tube is normally closed at one end by a diaphragm having a preselected rupture pressure. A compression piston is contained within the compression tube and is adapted for movement from a piston end of the tube toward the diaphragm end. Connected to the diaphragm end of the compression tube is an elongated shock tube having a test end remote from the diaphragm and being filled with a low pressure driven gas such as ambient air. When the piston is moved from the piston starting end of the compression tube toward the diaphragm end, the gas within the compression tube is compressed, thus generating pressure and causing the diaphragm to rupture. The rupturing of the diaphragm causes a volume of the compression gas to pass through the ruptured diaphragm and into the connected shock tube to form a shock wave. The shock wave compresses the driven gas during movement through the shock tube, thereby creating the desired test conditions at the test site. In the case of the shock tunnel, the compressed gas is further processed through a nozzle at the final test site.

The piston in a conventional free piston shock tube/tunnel is driven by compressed gas introduced behind the piston. During the compression movement of the piston toward the diaphragm end the gas in the compression tube can be compressed to pressures as high as 2,000 atm or greater. This in turn can generate a shock wave in the shock tube which can create test conditions in the driven gas with temperatures as high as 12,000K and pressures as high as 3,000 atm.

Despite the utilization of free piston shock tube/tunnels for 40 years or more, and despite continuing studies for the purpose of more fully understanding the operation, and optimizing the performance, of free piston shock tube/tunnels, their general construction has not changed significantly. A typical free piston shock tunnel is disclosed in Patent Cooperation Treaty Publication No. WO89/02071 by Raymond Stalker. Published studies relating to the performance and operation of free piston shock tube/tunnels include an article entitled "Pressure Losses In Free Piston Drive Shock Tubes" by N. W. Page and R. J. Stalker in Shock Tubes and Wave (14th International Symposium on Shock Tubes and Shock Waves) August, 1983 at page 118 and an article entitled "The Piston Motion In A Free Piston Drive For Shock Tubes And Tunnels" by Hans G. Hornung at GALCIT, California Institute Of Technology, 1988. Free Piston Shock Tube/Tunnel technology is also disclosed in U.S. Pat. Nos. 5,115,665 and 5,245,868 issued to Lacey et al.

Two areas of a free piston shock tube/tunnel which are important to the operation of the device include the mechanism at the piston end of the compression tube for releasing the piston to start the shot and the mechanism, conventionally in the form of a diaphragm, at the diaphragm end for releasing the high pressure gas downstream of the piston.

Release of the piston to start the shot is usually accomplished by applying a pressure force on the upstream side of the piston, thereby causing the piston to move slightly downstream. Such movement uncovers a multiplicity of holes which allows high pressure air from the high pressure reservoir to flow rapidly to the space upstream of the piston, thereby accelerating the piston and providing it with high velocity. The embodiment of such a conventional mechanism places a portion of the piston over the multiplicity of holes with seals both upstream and downstream of the holes, thus prohibiting flow of the high pressure reservoir gas through the holes. The holes can be on an assembly smaller than the compression tube so that the piston sealing surface is on the inside of the piston, or they can be on upstream extension of the piston also smaller than the compression tube diameter. Still further, the holes can be on the compression tube diameter itself. In any of these cases, the flow pressure is decreased as it flows through the restricted openings, thereby reducing the performance. It is beneficial to make this assembly at least as large as the compression tube to facilitate flow. Further, the pistons in prior structures are sealed by two seals, one near the upstream end and a drive seal near the downstream end. The downstream drive seal moves with the piston, pressing against the compression tube inner diameter during movement of the piston. This causes wear on the seal and results in debris on the upstream side of the piston. As a result, with conventional shock tube/tunnels, the seal must be replaced after each shot since it is exposed to high pressure during the charging of the high pressure reservoir. Accordingly, a need exists in the art for an improved mechanism for releasing the piston at the start of the shot which takes full advantage of the pressure in the high pressure reservoir and which enables the drive seal to be used repeatedly.

A second area of a free piston shock tube/tunnel which is important in defining the operation of the device is the mechanism at the diaphragm end of the compression tube for releasing high pressure from the compression tube into the shock tube. This is conventionally accomplished by providing a metal diaphragm which is designed to rupture at a pre-selected rupture pressure. When such rupture occurs, high pressure gas accelerates from the compression tube, through the opening of the ruptured diaphragm and into the shock tube through a pneumatic shock process. Several deficiencies exist with the presently used metal diaphragms. First, they are quite expensive and can only be used once. Second, in most cases, the rupture of the diaphragm occurs relatively slowly, with the first part of the rupture being over a relatively small area. This initial opening causes weak shocks, with the full shock strength being created only at a length down the shock tube. Ideally, the mechanism at the diaphragm end would open instantaneously to full area, thereby creating the full shock strength immediately. Third, even when the diaphragm opens fully, it reduces the area of the opening in the shock tube. This requires that higher burst pressure and/or larger shock tube openings be used. Each alternative causes the diaphragm problem to become more complicated and difficult to handle. Fourth, when the diaphragm does open, small pieces of fragments from the ruptured diaphragm can be released and move downstream to the end of the shock tube. In large, high pressure shock tube/tunnels, these fragment pieces can cause significant damage.

Accordingly, there is also a need for an improved free piston shock tube/tunnel and in particular an improved mechanism for releasing the piston to start the shot and an improved mechanism for releasing the high pressure gas from the compression tube for flow into the shock tube.

SUMMARY OF THE INVENTION

In contrast to the prior art, the present invention provides a high speed valve assembly on the upstream side of the piston in lieu of seals on or sealing against the piston. This valve is held in a closed position during the charging of the high pressure reservoir by pressure in a valve control chamber which opposes the pressure in the high pressure reservoir. With the structure of the piston release valve in accordance with the present invention, the opening of such valve causes the immediate communication between the high pressure chamber and the rearward end of the piston. Further, the structure of the piston release valve of the present invention is such that the driver seal between the piston and the compression tube is not exposed to the high pressure reservoir during the charging process. Thus, it can withstand the imperfections resulting from movement of the piston along the compression tube, thereby facilitating its repeated use. This also eliminates the need to remove the piston after each shot. Instead, the piston can be moved along the inside of the compression tube to the piston end by pressure or vacuum for reuse.

A further feature of the present invention is the provision of a high speed valve assembly at the diaphragm end of the compression tube which is designed to replace the conventional diaphragm and to overcome many of the deficiencies described above with respect to diaphragm use. First, the diaphragm valve in accordance with the present invention can be repeatedly reused without replacement, thus significantly reducing costs relative to the use of a diaphragm which must be replaced after each shot. Secondly, the diaphragm valve of the present invention provides for at least the same opening speed if not greater than the conventional diaphragm mechanism.

Accordingly, it is an object of the present invention to provide an improved free piston shock tube/tunnel having a high speed piston release valve for releasing the piston.

Another object of the present invention is to provide a piston release valve for a shock tube/tunnel which isolates the piston drive seal from the high pressure reservoir during the charging process.

A further object of the present invention is to provide a high speed piston release valve which immediately exposes the high pressure reservoir to the rearward end of the piston upon opening of such valve.

A still further object of the present invention is to provide a high speed valve for replacement of a conventional diaphragm in a free piston shock tube/tunnel.

Another object of the present invention is to provide a high speed valve for the diaphragm end of the compression tube which eliminates the use of a diaphragm and which can be repeatedly reused for multiple shots.

A still further object of the present invention is to provide a free piston shock tube/tunnel having an improved high speed piston release valve and an improved high speed diaphragm valve.

These and other objects of the present invention will become apparent with reference to the drawings, the description of the preferred embodiment and the appended claims.

DESCRIPTION OF THE PREFERRED EMBODIMENT

Figures 1, 1B:
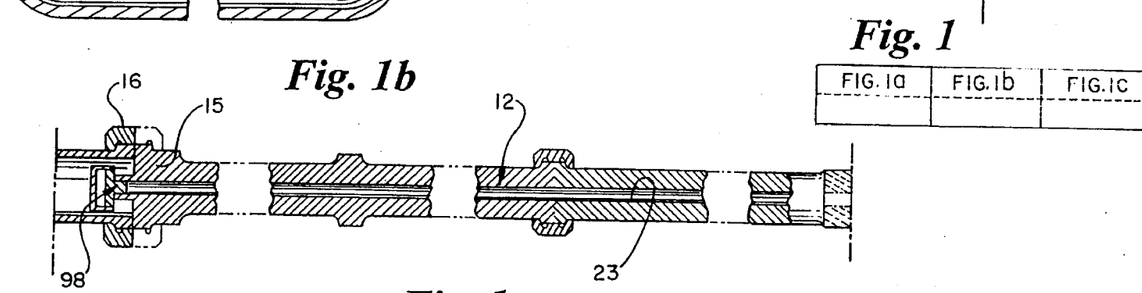
FIG. 1 is comprised of FIGS. 1a, 1b and 1c and is a side view, partially in section, of the free piston shock tube/tunnel in accordance with the present invention.
Figure 1A:
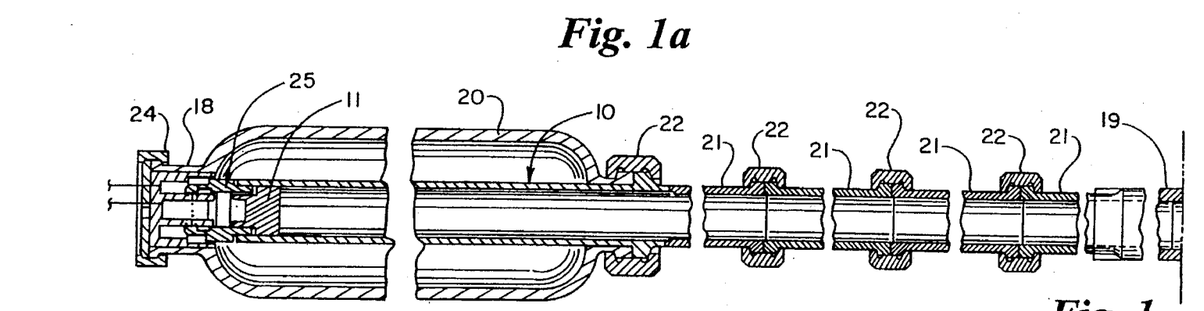
Figure 1C:
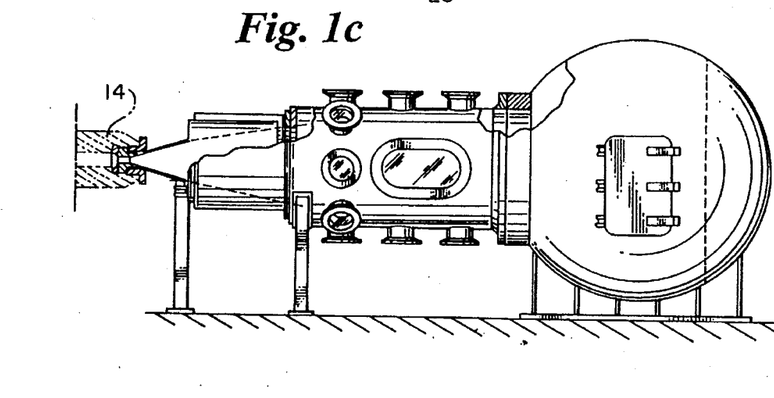

General reference is first made to FIG. 1 showing a side view of the elongated free piston shock tube/tunnel of the present invention. As illustrated, the shock tube/tunnel includes an elongated compression chamber 10 and an elongated shock tube 12 connected end to end with the compression tube 10 via an appropriate connecting collar 16. A free piston 11 is adapted for movement from one end of the compression tube 10 toward the other for the purpose of compressing a compression gas within the tube 10.

In the preferred embodiment, the compression tube 10 has a generally cylindrical configuration and extends from a first or piston end 18 to a second or diaphragm end 19. Normally the compression tube 10 is constructed of high strength steel and is sufficient to withstand pressures as high as 2,000 atmospheres and temperatures as high as 7,000K for the short time required. A portion of the compression tube 10 near the piston end 18 is surrounded by a high pressure reservoir 20 for the purpose of containing the compressed gas which ultimately accelerates the piston 11. The actual length of the compression tube 10 is a matter of shock tube/tunnel design. Generally, it is contemplated that the compression tube in the structure of the present invention will be at least 33 meters in length. In the preferred embodiment it is shown that the compression tube 10 is made up of a plurality of compression tube sections 21. These are connected with one another by corresponding split hub clamps 22 in a manner known in the art. The compression tube 10 is filled with a driver gas such as helium which is capable of undergoing a generally quasi-steady adiabatic compression during movement of the piston. Various other gases, however, may be used. Prior to release of the piston, the pressure of the helium in the compression tube is maintained at about 30 psi.

The piston end 18 of the compression tube 10 is provided with a closure head 24 and a mechanism in the form of the high speed valve assembly 25 for releasing the piston 11 to start the shot. The details of the preferred structure of the valve assembly 25 is illustrated best in FIGS. 2, 3 and 4. As shown, the closure head 24 is connected at one end to the high pressure reservoir 20 and at the other end to a terminal head 26 via the collar 28. Sealing means in the form of an o-ring 29 is positioned between the closure head 24 and the terminal head 26 to form a seal between such elements.

Figure 2:
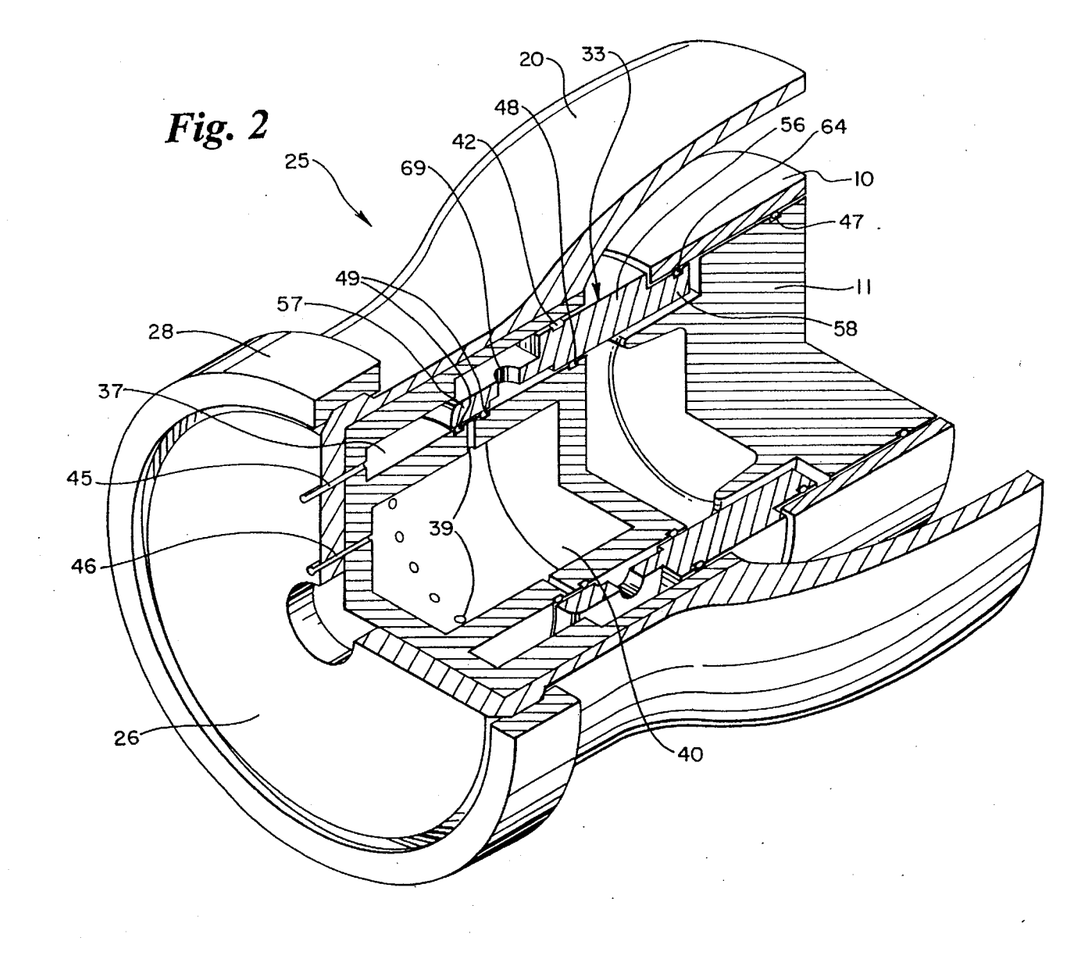
FIG. 2 is a perspective view of the piston release valve assembly in accordance with the present invention, with portions broken away.
Figure 3:
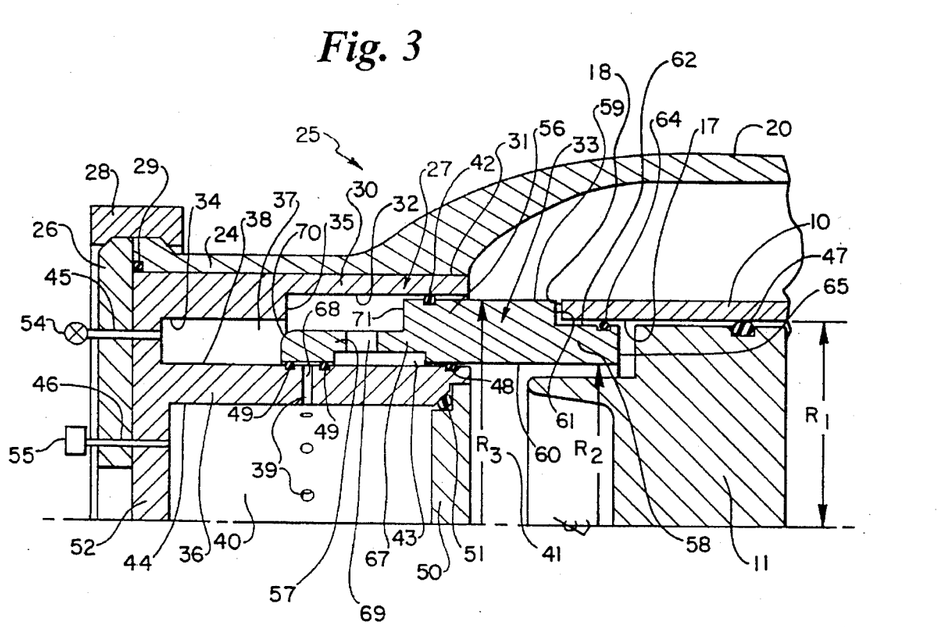
FIG. 3 is a view, partially in section, of the piston release valve of FIG. 2 cut by a vertical plane from an outer surface of the valve to the symmetrical center, with the valve in a closed position.
Figure 4:
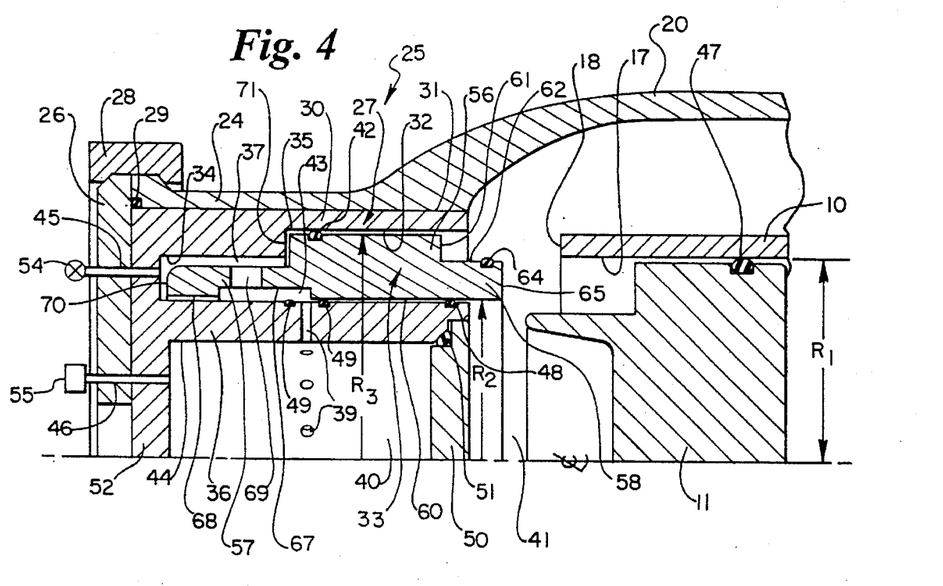
FIG. 4 is a sectional view similar to FIG. 3, but with the valve in an open position.

The valve assembly 25 includes a valve sleeve assembly 27 mounted within the closure head 24 and a cooperating valve body assembly 33 extending between the end 18 of the compression tube 10 and the valve sleeve assembly 27. The valve sleeve 27 and the valve body 33 function to release the piston to start the piston shot by facilitating the flow of high pressure from the high pressure reservoir 20 to the area 41 behind the piston 11.

The valve sleeve assembly 27 has a generally annular configuration, and includes an outer or first annular sleeve portion 30 with an outer cylindrical surface 31 for tight fitting engagement with the inner surface of the closure at 24. The rearward end of the surface 31 is sealed relative to the closure head 24 and the terminal head 26 via the o-ring 29. The outer annular seal portion 30 includes a first inner cylindrical surface 32 and a second inner cylindrical surface 34 located rearwardly of the surface 32 and being of a smaller radius. As will be described in greater detail below, the surfaces 32 and 34 are sized to receive corresponding portions of the valve body 33. The surfaces 32 and 34 are separated by a shoulder 35 which defines the maximum rearward movement of the valve body 33.

The valve assembly 27 also includes an inner annular sleeve portion 36 having an outer cylindrical surface 38 and an inner cylindrical surface 44. The outer surface 38 includes an o-ring seal 48 near its forward end for sealing engagement with a portion of the valve body 33. The surface 38 is also provided with a pair of o-ring seals 49, 49 extending around the circumference of the surface 38 for sealing against a rearward portion of the valve body 33. The o-rings 49, 49 are positioned on opposite sides of a plurality of restrictive ports 39 extending between the surfaces 38 and 44 and joining the chambers 37 and 40.

The forward end of the valve sleeve assembly 27 is provided with a closure plate 50 which is connected in sealed relationship to the forward ends of the annular sleeve 36 by an o-ring seal 51. The rearward end of the valve sleeve assembly 27 is provided with a rearward closure wall 52. The wall 52, together with the inner surface 44 of the sleeve 36 and the inner surface of the forward closure wall 50 define an air dump volume or chamber 40 to assist in cushioning the rearward movement of the valve body 33 as will be described in greater detail below.

The rearward wall 52 and terminal head 26 are provided with vents 45 and 46 in communication with the chambers 37 and 40, respectively. Specifically, the vent 45 is a piston activation vent which functions to selectively release pressure from within the chamber 37, thereby allowing rearward movement of the valve body 33 and corresponding communication between the high pressure chamber 20 and the area 41 rearward of the piston 12. The vent 45 is provided with an appropriate valve for selectively controlling the release of pressure from the chamber 37. The vent 45 can also be used to charge the chamber to a preselected pressure prior to charging the high pressure reservoir 20. The vent 46 is a control vent for establishing the desired pressure within the air dump chamber 40. Connected with the vent 46 is a pressure control means 55 which can provide pressure within the chamber 40, if desired, or release pressure from the chamber 40, if desired. Generally, the initial pressure within the air dump chamber 40 is approximately atmospheric pressure.

The valve body assembly 33 includes a central annular valve body portion 56, a rearward generally annular valve body portion 57 and a forward generally annular valve body portion 58. The central valve body portion 56 includes an outer cylindrical surface 59. The surface 59 is provided with an o-ring seal 42 for sealing engagement with the inner cylindrical surface 32 of the sleeve 30. The body portion 56 also includes an inner cylindrical surface 60 adapted for sealing engagement with the o-ring seal 48 of the sleeve 36.

The forward valve body portion 58 is integrally formed with and extends forwardly of the central valve body portion 56. The body portion 58 includes an outer cylindrical surface portion 62 and an inner cylindrical surface portion which is an extension of the inner cylindrical surface portion 60 of the valve body portion 56. The outer cylindrical surface 62 is provided with an oring seal 64 for sealing against the inner cylindrical surface of the compression tube 10. The valve body portion 58 includes a forward end 65, the surface area of which is acted upon by pressure in the area 41 to the rear of the piston 11 to urge the valve body assembly 33 rearwardly. A shoulder 61 extends between the outer cylindrical surface 62 and the outer cylindrical surface 59. The surface area of the shoulder 61 is responsive to pressure within the high pressure chamber 20 tending to urge the valve body assembly 33 rearwardly toward an open position as shown in FIG. 4.

The rearward valve body portion 57 is integrally formed with, and extends rearwardly from, the central valve body portion 56. The valve body portion 57 includes an outer cylindrical surface 66 and a pair of interior cylindrical surfaces 67 and 68. As shown best in FIGS. 3 and 4, the surface 67 is spaced outwardly from the outer surface 38 of the sleeve 36, while the inner cylindrical surface 68 is closely adjacent to the surface 38 such that it is engageable in sealing relationship with the o-ring seals 49.

A plurality of communication ports 69 which are larger than the restrictive ports 39 are provided around the periphery of the body portion 57. These ports 69 function to provide communication between the chamber 37 and the area 43 between the surfaces 67 and 38, and thus ultimately with the chamber 40 via the ports 39 when the valve is in an open position as shown in FIG. 4. The rearward end of the valve body portion 57 is provided with an end wall 70 against which pressure within the chamber 37 acts to urge the valve body assembly 33 forwardly toward a closed position. A shoulder 71 joins the outer cylindrical surface 59 of the central valve body portion 56 and the outer cylindrical surface 66 of the rearward valve body portion 57. During operation, pressure within the chamber 37 acts against the shoulder 71 to urge the valve body assembly 33 toward a closed position.

As illustrated best in FIGS. 3 and 4, the inner cylindrical surface of the compression tube 10 has a radius of $R_1$, the inner cylindrical surfaces 60 and 68 have a radius $R_2$ and the outer cylindrical surface 59 has a radius $R_3$. These particular radii $R_1$, $R_2$ and $R_3$ are important in the functioning of the valve assembly 27 of the present invention in that they define the various surface areas of the valve body assembly 33 against which pressures within the chambers 37, 20 and 41 act against the valve body assembly 33.

Accordingly, the valve assembly shown in FIGS. 2, 3 and 4 includes a first seal surface comprised of the inner surface 17 of the tube 10, and a second seal surface in the form of the surface 32. This surface 32 is spaced from the first seal surface and defines a passage between the first and second seal surfaces, that area between the compression tube end 18 and the forward end of the sleeve 32. The valve body 33 includes a third seal surface in the form of the surfaces 59 and 62 and first and second seal members 64 and 42 for sealing engagement between the surfaces 17 and 62 and between the surfaces 32 and 59, respectively.

The valve body 33 is moveable between a closed position illustrated in FIG. 3 and an open position illustrated in FIG. 4. In its closed position, the seal member 64 is positioned in sealing engagement between the surfaces 17 and 62 and the seal member 42 is positioned in sealing engagement between the surfaces 32 and 59. In an open position, the seal member 64 is out of sealing engagement between the surfaces 17 and 62.

Having described the detailed structure of the valve assembly illustrated in FIGS. 2, 3 and 4, its operation can be understood as follows. As described above, the valve body assembly is moveable between a closed position illustrated in FIG. 3 and an open position illustrated in FIG. 4. When in the closed position, the o-ring 64 is sealed against the inner surface 17 of the compression tube 10, and the o-ring seals 42 and 48 are sealed against the cylindrical surfaces 32 and 60, respectively of the central valve body portion 56. Accordingly, when the valve body assembly 33 is in its closed position, the pressures urging the body assembly 33 toward an open position include the pressure within the high pressure reservoir 20 which, when fully charged, can be as high as 3,000 psi or more, and the pressure within the chamber 41. The pressure in the chamber 20 acts against the surface area of the shoulder 61, while the pressure in the chamber 41 which is commonly about 30 psi acts against the surface area of the end 65. When the valve is in its closed position, the pressures acting to keep it closed include the pressure within the chamber 37 acting against the rearward surfaces of the valve assembly, namely, the wall surface 70 and the shoulder 71. Normally, the pressure maintained within the chamber 37 during the charging process to maintain the valve body assembly 33 in its closed position is at least about 1,500 psi.

After the high pressure chamber 20 has been fully charged to the pressure desired and the piston is ready to be shot, the valve assembly 27 is opened by causing movement of the valve body 33 rearwardly so that the o-ring 64 moves rearwardly of the rearward end 18 of the compression tube 10. This rearward movement is accomplished by opening the valve 54 to allow release of pressure from within the chamber 37. As this occurs, the pressures acting on the shoulder 61 and the wall 65 overcome the pressure within the chamber 37 acting on the surfaces 70 and 71, thereby causing the valve assembly 33 to move rearwardly toward its open position. As soon as the o-ring 64 passes the rearward end 18 of the compression tube 10, high pressure from the chamber 20 quickly expands into the chamber 41 to the rear of the piston. This pressure in the chamber 41 begins to accelerate the piston, but at the same time acts against the entire surface 65 to quickly move the valve body assembly 22 to its fully opened position shown in FIG. 4, thereby almost instantaneously allowing full communication between the high pressure reservoir 20 and the area 41 at the rear of the piston.

As the valve body 33 moves rearwardly, the inner surface 68 moves past the seals 49, thereby opening the restrictive ports 39 from the chamber 40 to the chamber 43 and thus the chamber 37 via the communications ports 69. These ports 39 and 69, together with the existence of the air dump chamber 40 assists in cushioning the rearward movement of the valve body assembly 33 so that it does not bounce off the shoulder 35 toward a closed position.

It should be noted that during the entire process of charging the high pressure reservoir 20, the driver seal 47 between the piston 11 and the inner surface 17 of the compression tube 10 is free of any exposure to the pressure in the high pressure chamber 20. Thus, it can be used during repeated shots of the piston despite the fact that significant wear occurs during travel of the piston along the compression tube 10.

After the piston shot is completed, the valve assembly of the present invention enables the piston 11 to be returned to its initial startup position by moving it rearwardly along the compression tube 10 to the position illustrated in FIG. 3. This can be done in a variety of ways. One way includes providing a vacuum within the chamber 41 to draw the piston 11 from the diaphragm end back to its start position. The vacuum can be applied through a vacuum port such as that shown and described with respect to the embodiment of FIGS. 5 and 6. The pressure in the chamber 37 can then be increased to the desired level and the charging of the high pressure reservoir 20 can be repeated for another shot.

Figure 5:
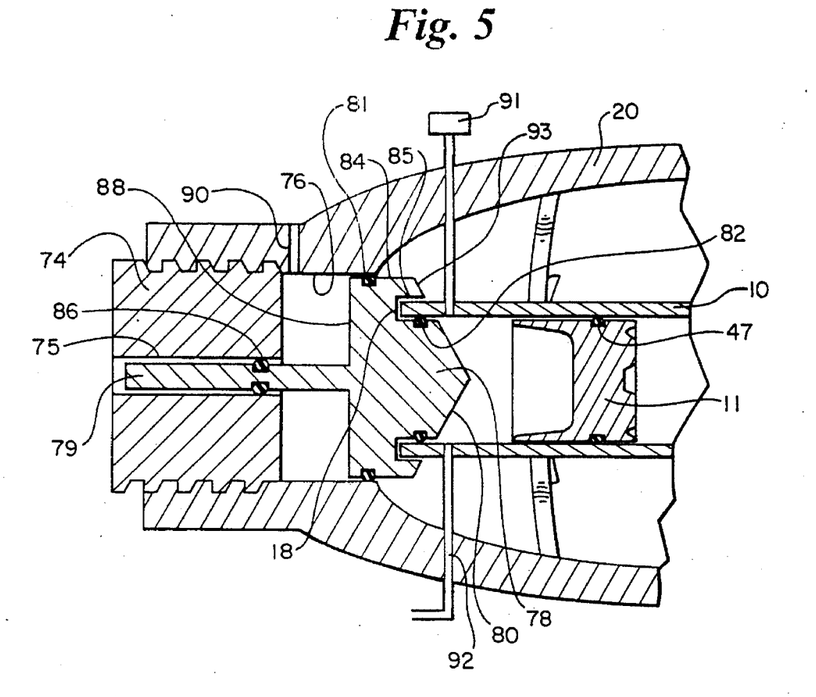
FIG. 5 is a view, partially in section, of an alternative embodiment of a piston release valve cut by a vertical plane through the symmetrical center, with the valve in a closed position.
Figure 6:
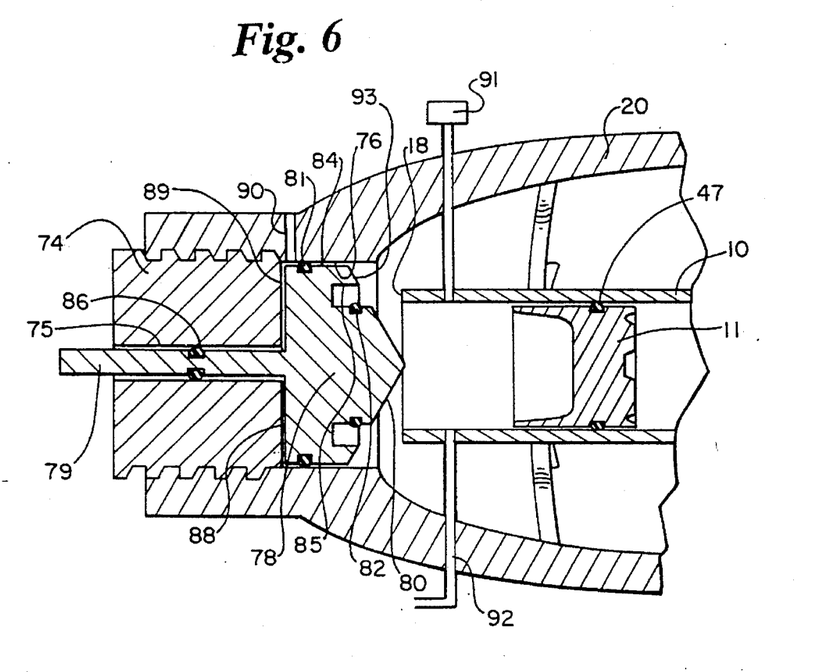
FIG. 6 is a sectional view similar to FIG. 5, but with the valve in an open position.

A further embodiment of the improved piston release valve in accordance with the present invention is illustrated in FIGS. 5 and 6. Although the structure of this further embodiment differs in some respects from that of FIGS. 2, 3 and 4, the operation is quite similar. The structure of FIGS. 5 and 6 includes an end closure 74 having a centrally positioned cylindrical opening 75. The valve assembly of FIG. 5 and 6 includes an outer sleeve portion comprised of the inner cylindrical surface 76 of the rearward end of the high pressure reservoir 20. An inner valve sleeve is formed by the inner cylindrical surface of the opening 75 within the enclosure 74.

The valve body assembly includes a forward body portion 78 and a rearward body portion 79. The forward body portion 78 includes an outer cylindrical surface 84 having an o-ring seal 81 for sealing engagement with the sleeve surface 76. The forward valve body portion 78 is also provided with an annular shaped recessed area 85 provided with an o-ring seal 82 for sealing against the inner cylindrical surface of the compression tube 10. The body portion 78 is also provided with a forward pressure receiving surface 80 comprised substantially of the entire cross sectional surface area of the inside of the compression tube 10. The rearward valve body portion 79 is provided with an o-ring seal 86 for sealing against the inner cylindrical surface of the sleeve 75. The rearward surface 88 of the valve body portion 78 together with the forward wall portion of the end closure 74 and the inner sleeve surface 76 define a chamber 89. Pressure within the chamber 89 acts against the surface 88 to urge the valve body assembly toward a closed position as shown in FIG. 5. Prior to charging of the high pressure reservoir 20, pressure is introduced into the chamber 89 via the vent 90 to maintain the valve body 78 in its closed position during charging of the reservoir 20. When the reservoir 20 is fully charged, and the piston 12 is ready to be shot, pressure is released through the vent 90. At a certain point, the pressure within the high pressure reservoir acting against the surface portion 93 on the forward end of the valve body portion 78 overcomes the pressure in the chamber 89 acting on the surface 88, thereby resulting in the valve body assembly moving rearwardly toward an open position illustrated in FIG. 6. As soon as the o-ring seal 82 moves rearwardly of the rearward end 18 of the compression tube 10, the pressure within the high pressure chamber 20 is exposed to the entire forward surface 80 of the valve body 78. This results in the instantaneous rearward movement of the body 78 and thus full opening of the valve. This in turn results in the pressure within the high pressure reservoir 20 to be fully and immediately exposed to the rearward surface of the piston 12.

Also illustrated in the embodiment of FIGS. 5 and 6 is a piston sensing means 91 for determining when the piston has reached its desired start point and a vacuum vent 92 which can be selectively activated to pull the piston 12 rearwardly along the compression tube 10 after the completion of a shot to place the piston 12 in its start position.

A further feature of the present invention is the provision of a high speed valve at the diaphragm end of the compression tube 10 to release the high pressure from within the compression tube 10 into the shock tube 12. This high speed valve is illustrated best in FIGS. 7 and 8 and is designed to replace the conventional diaphragm which is normally positioned between the end of the compression tube 10 and the shock tube 12. Such diaphragms normally rupture at a preselected pressure to cause pressure from within the compression tube 10 to be released into the shock tube 12.

Figure 7:
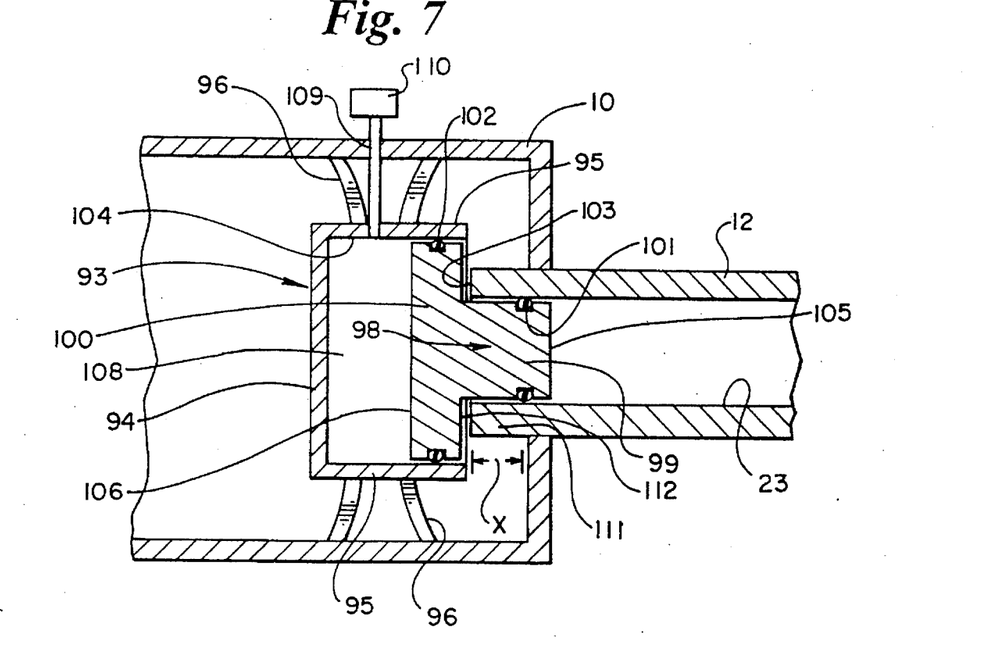
FIG. 7 is a sectional view of the high speed valve in accordance with the present invention at the diaphragm end of the compression tube with the valve in a closed position.
Figure 8:
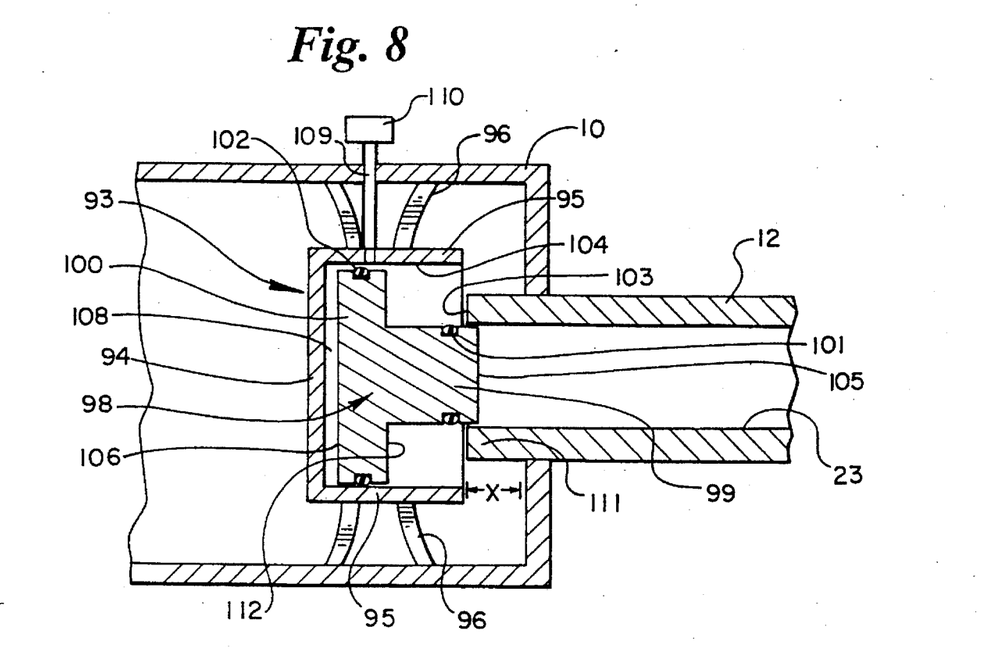
FIG. 8 is a sectional view similar to FIG. 7 with the valve in an open position.

As shown, the valve includes a valve housing 93 with a rearward housing wall 94 and a generally cylindrical valve sleeve 95 extending forwardly from the wall 94. The valve housing 93 is suspended centrally within the compression tube 10 by a plurality of support struts 96 positioned about the periphery of the housing 93. The high speed valve also includes a valve body 98 comprised of a forward valve body portion 99 and a rearward valve body portion 100. The forward valve body portion 99 includes an o-ring 101 adapted for sealing engagement with the inside cylindrical surface of the shock tube 12, while the rearward valve body portion 100 includes an o-ring 102 for sealing engagement with an inner cylindrical surface 104 of the sleeve 95. The forward valve body 99 is provided with a forward wall 105, while the rearward valve body portion 100 is provided with a rear wall 106. The rear wall 106 together with the inner surface of the wall 94 and the inner surface 104 of the sleeve 95 defines a valve control chamber 108. A pressure supply or exhaust port 109 extends from the sleeve 95 through the compression chamber wall to a means 110 for selectively providing pressure to or exhausting pressure from the chamber 108.

The valve body 98 of FIG. 7 is moveable between a closed position as illustrated in FIG. 7 in which the o-ring 101 is positioned downstream of the end 103 of the shock tube extension 111 and an open position in which the o-ring 101 is moved rearwardly of the end 103 of the shock tube extension 111. Initially, prior to a piston shot, the forces acting upon the valve body 98 include the pressure in the chamber 108 acting on the surface 106 tending to close the valve and a pressure within the compression tube 10 acting on the surface 112 plus the pressure within the shock tube 12 acting on the surface 105 tending to open the valve. Prior to a piston shot, the pressure within the chamber 108 is charged to about 1,500 psi, while the pressure in the compression tube 10 is about 30 psi and the pressure in the shock tube is about atmospheric.

Having described the structure of the high speed diaphragm valve as shown in FIG. 7, the operation can be understood as follows. Prior to the piston shot, the chamber 108 is pressurized to the desire level. As indicated above, this will generally be in the range of up to 1,500 psi or greater. When the piston is released, the pressure within the compression tube 10 will increase rapidly as the piston moves toward the diaphragm end. This pressure within the tube 10 acts against the surface 112 tending to move the valve body 98 rearwardly toward an open position against the pressure within the chamber 108. The more the valve body 98 moves rearwardly, the higher the pressure within the chamber 108 becomes and the greater the force is that is needed to move the valve body 98 further. The amount of movement of the valve body 98 needed to open the valve is defined by the distance "x" between the o-ring 101 and the inner end 103 of the shock tube extension 111. By selecting the proper distance "x" and selecting the proper initial pressure within the chamber 108, the pressure within the compression chamber 10 needed to open the valve as well as the time needed to open it can be determined. Thus, the particular distance "x", the size of the chamber 108 and the initial pressure within the chamber 108 are parameters which control the time it takes to open the valve as well as the pressure needed to open it.

Although the description of the preferred embodiment has been quite specific, it is contemplated that various modifications could be made to the preferred embodiment without deviating from the spirit of the present invention. Accordingly, it is intended that the scope of the present invention be dictated by the appended claims rather than by the description of the preferred embodiment.

We claim:

1. A piston release valve for a free piston shock tube/tunnel having a compression tube, a piston positioned within said compression tube and a high pressure reservoir, said release valve comprising:

a first seal surface in communication with said compression tube;

a second seal surface spaced from said first seal surface to define a high pressure passage between said first and second seal surfaces;

a valve body separate from the piston having a third seal surface extendable between said first and second seal surfaces;

a first seal member positioned between said second and third seal surfaces for sealing engagement therewith; and a second seal member positionable between said first and third seal surfaces for selective sealing engagement therewith, said valve body being moveable relative to said piston between a closed position in which said second seal member is positioned between said first and third seal surfaces for sealing engagement therewith and an open position in which said second seal member is out of sealing engagement between said first and third seal surfaces.

2. The piston release valve of claim 1 wherein said second seal surface comprises an inner cylindrical surface of a first valve sleeve portion.

3. The piston release valve of claim 2 wherein said first valve sleeve portion is fixed relative to said compression tube.

4. The piston release valve of claim 2 wherein said third seal surfaces comprises an outer cylindrical surface of said valve body.

5. The piston release valve of claim 4 wherein at least one of said first and second seal members are carried by and moveable with said outer cylindrical surface of said valve body.

6. The piston release valve of claim 1 wherein said high pressure passage extends between said high pressure reservoir and said piston, whereby said high pressure reservoir is in communication with said piston through said high pressure passage when said valve body is in its open position and said high pressure passage is closed when said valve body is in its closed position.

7. The piston release valve of claim 2 including a second valve sleeve portion having an outer cylindrical surface spaced from said inner cylindrical surface of said first valve sleeve portion and defining a fourth seal surface.

8. The piston release valve of claim 7 wherein said valve body has an outer cylindrical surface defining said third seal surface and an inner cylindrical surface defining a fifth seal surface and said valve further includes a third seal member positioned between said fourth and fifth seal surfaces for sealing engagement therewith.

9. The piston release valve of claim 8 including a piston release control chamber in communication with said inner cylindrical surface of said first sleeve portion and said outer cylindrical surface of said second sleeve portion.

10. The piston release valve of claim 9 including means for selectively controlling the pressure within said piston release control chamber.

11. The piston release valve of claim 10 including an air dump chamber adapted for selective communication with said piston release control chamber.

12. The piston release valve of claim 1 wherein said first and second seal members are o-ring seals.

13. A high speed valve for use in a free piston shock tube/tunnel of the type having a compression tube, a piston within the compression tube and a shock tube connected with the compression tube downstream of the piston, and comprising:

a first seal surface in communication with said shock tube;

a second seal surface spaced from said first seal surface to define a high pressure passage between said first and second seal surfaces;

a valve body separate from the piston having a third seal surface extendable between said first and second seal surfaces;

a first seal member positioned between said second and third seal surfaces for sealing engagement therewith; and a second seal member positionable between said first and third seal surfaces for selective sealing engagement therewith, said valve body moveable relative to said piston between a closed position in which said second seal member is positioned between said first and third seal surfaces for sealing engagement therewith and an open position in which said second seal member is out of sealing engagement between said first and third seal surfaces "the valve adapted to release compressed gas from the compression tube into the shock tube".

14. The valve of claim 13 wherein said second seal surface comprises an inner cylindrical surface of a valve sleeve.

15. The valve of claim 14 wherein said valve sleeve is fixed relative to said shock tube.

16. The valve of claim 14 wherein said third seal surface comprises an outer cylindrical surface of said valve body.

17. The valve of claim 14 wherein at least one of said first and second seal members are carried by and moveable with said outer cylindrical surface of said valve body.

18. The valve of claim 13 including a selectively pressurized chamber resisting movement of said valve body toward an open position.

19. The valve of claim 18 including means for selectively introducing pressure into and exhausting pressure from said selectively pressurized chamber.

20. The valve of claim 13 including means for causing said valve to open in response to a preselected pressure within said compression tube.

* * * * *